UNITED STATES PATENT OFFICE.

ERNST H. RICHTER, OF TAUNTON, MASSACHUSETTS.

IMPROVEMENT IN COMPOSITIONS FOR FIRE-BRICK, STOVE-LININGS, &c.

Specification forming part of Letters Patent No. 156,946, dated November 17, 1874; application filed May 16, 1874.

*To all whom it may concern:*

Be it known that I, ERNST H. RICHTER, of Taunton, Bristol county, Massachusetts, have invented a new and Improved Composition for Fire-Brick, Stove-Lining, &c., of which the following is a specification:

This invention relates to a new composition for producing a superior style of fire-brick, stove-lining, &c., that will be light, durable, and not liable to clinker.

The composition is produced from the following-named ingredients, in about the proportions set forth, to wit: One hundred parts fire-clay, twenty parts oyster-shells, three parts lime.

These ingredients, previous to being burned, are each pulverized, and then mixed together and molded. By employing the shells in a raw state all their natural properties are retained and enter into the composition, thereby, it is found, greatly enhancing its quality.

Instead of oyster-shells, others possessing similar properties may be used. The lime may be either limestone dissolved or crumbled or gas-house lime. After the ingredients are properly prepared they are burned in the ordinary manner.

When it is desired to give greater body to the mixture, I may add to it a suitable proportion of burnt fire-clay, silex, spar, sand, ashes, or mica; but the composition is in every way good without either of these additions.

I claim as my invention—

The stove-lining or fire-brick composed of fire-clay, shells, and lime, substantially as described.

ERNST H. RICHTER.

Witnesses:
GEORGE H. BABBITT, Jr.,
GEO. H. BABBITT.